US006651152B1

(12) United States Patent
Ueki et al.

(10) Patent No.: US 6,651,152 B1
(45) Date of Patent: Nov. 18, 2003

(54) MICROCOMPUTER INCLUDING DOWNLOAD CIRCUIT CONTROLLING DATA DOWNLOAD TO PLURALITY OF MEMORIES

(75) Inventors: Hiroshi Ueki, Hyogo (JP); Teruaki Kanzaki, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/504,727

(22) Filed: Feb. 16, 2000

(30) Foreign Application Priority Data

Aug. 19, 1999 (JP) .......................................... 11-232487

(51) Int. Cl.[7] .............................................. G06F 13/00
(52) U.S. Cl. ....................................... 711/166; 711/154
(58) Field of Search ................................. 711/166, 154

(56) References Cited

U.S. PATENT DOCUMENTS

| 5,396,639 A | * | 3/1995 | Suenaga et al. ............... 712/37 |
| 5,898,635 A | * | 4/1999 | Raad et al. ............ 365/189.09 |
| 6,119,211 A | * | 9/2000 | Kaneko et al. ........ 365/189.01 |

* cited by examiner

Primary Examiner—Reba I. Elmore
(74) Attorney, Agent, or Firm—McDermott, Will & Emery (57) ABSTRACT

A microcomputer system having a central processor, a plurality of memory types and a bus interface circuit is configured to allow an external device to download and upload data to/from the various memories using a download circuit connected to the plurality of memories via the bus interface circuit. In operation, a first reset signal, a second reset signal and a mode set signal operate to control whether the central processor or the download circuit will be active, and whether a selector will couple the central processing unit or the download circuit to the bus interface circuit.

20 Claims, 7 Drawing Sheets

MICROCOMPUTER INCLUDING DOWNLOAD CIRCUIT CONTROLLING DATA DOWNLOAD TO PLURALITY OF MEMORIES

BACKGROUND OF THE INVENTION

1. Field of the Invention

The present invention relates to a microcomputer including a download circuit (referred to as "DLC" hereinafter) controlling data input and output with a memory apart from a central processing unit (referred to as "CPU" hereinafter). Particularly, the present invention relates to a microcomputer that allows data input/output with respect to a memory without complex control and mechanism.

2. Description of the Background Art

Figure 1:
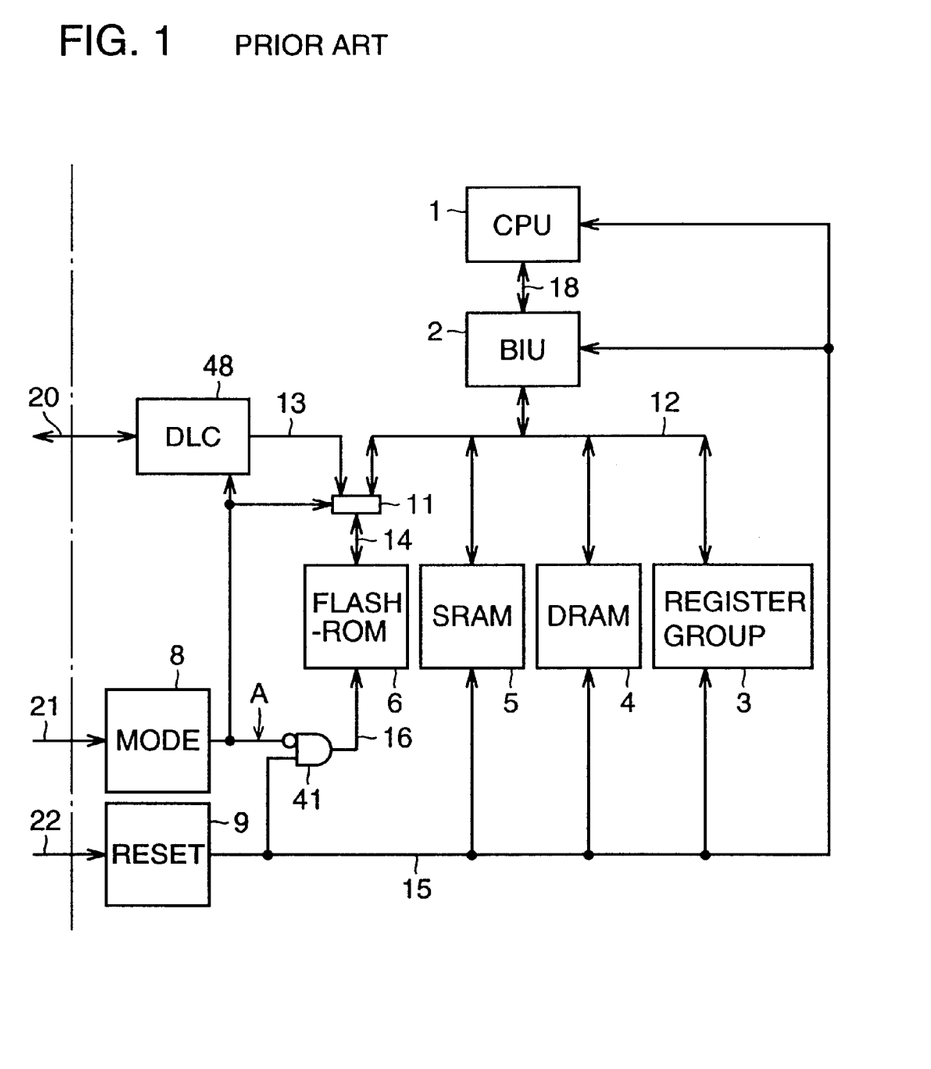
FIG. 1 is a block diagram of a conventional microcomputer.

Referring to FIG. 1, a conventional microcomputer with a DLC circuit includes a CPU 1, a register group 3, a DRAM (Dynamic Random Access Memory) 4, an SRAM (Static RAM) 5, a flash memory (Flash-ROM (Read-Only Memory)) 6, a BIU (Bus Interface Unit) 2 provided between CPU 1 and each of memories 3, 4, 5 and 6, a DLC 48 to write data (download) to flash memory 6 and read out data from flash memory 6, a mode set circuit 8 responsive to an external signal 21 for mode setting to output an internal mode set signal A setting the operational mode of the microcomputer to a download mode, a reset signal generation circuit 9 to generate and apply to CPU 1, BIU 2, register group 3, DRAM 4 and SRAM 5 a reset signal 15 in response to an external signal 22 for resetting, an AND gate 41 having a first input coupled to reset signal 15 and a second input coupled to an inverted version of internal mode set signal A to output a reset signal 16, and a selector 11 having a first input receiving a bus group 12 and a second input receiving a flash memory control signal group 13, under control of internal mode set signal A.

Selector 11 is under control of internal mode set signal A provided from mode set circuit 8. Selector 11 connects control signal group 14 of the flash memory from selector 11 to flash memory control bus group 12 when internal mode set signal A is at an L level (logical low). Selector 11 connects control signal group 14 of the flash memory to flash memory control signal group 13 when internal mode set signal A is at an H level (logical high).

This conventional microcomputer has DLC 48 rewrite data in flash memory 6 during reset as set forth in the following.

First, an external signal 22 for reset is applied to reset signal generation circuit 9. Reset signal generation circuit 9 provides reset signal 15 of an H level. In response to reset signal 15 attaining an H level, CPU 1, BIU 2, register group 3, DRAM 4 and SRAM 5 are all reset and stop operation. This reset signal 15 of an H level is also applied to the first input of AND gate 41. Assuming that internal mode set signal A output from mode set circuit 8 is at an L level (non-download mode), the other input of AND gate 41 is inverted to an H level. Therefore, reset signal 16 outputted from AND gate 41 attains an H level, whereby flash memory 6 is reset and stops operation.

Then, external signal 21 to set the microcomputer to a download mode is applied to mode set circuit 8. Mode set circuit 8 outputs internal mode set signal A of an H level. This internal mode set signal A is inverted and applied to the second input of AND gate 41. Therefore, the output of AND gate 41 attains an L level, whereby flash memory 6 attains an operable state. More specifically, AND gate 41 provides an output of an H level during reset and in a download mode, and otherwise an L level.

Since internal mode set signal A is at an H level, selector 11 connects flash memory control signal group 13 to control signal group 14 of the flash memory, so that DLC 48 can control flash memory 6. Under this state, data in flash memory 6 is rewritten via DLC 48 according to an external signal 20 for the DLC. DLC 48 receives external signal 20 and converts the same to a flash memory control signal group 13 that can control flash memory 6. The converted signal is output to selector 11. DLC 48 also converts the signal in control signal group 14 of the flash memory received from flash memory 6 into a predetermined format and provides the converted signal as external signal 20 for the DLC.

Since BIU 2 is in synchronization with the operation of CPU 1 during memory access at the time of non-reset, an ACK (complete) signal is output to CPU 1 via a signal group 18 when the process of access request from CPU 1 is completed.

Figure 2:
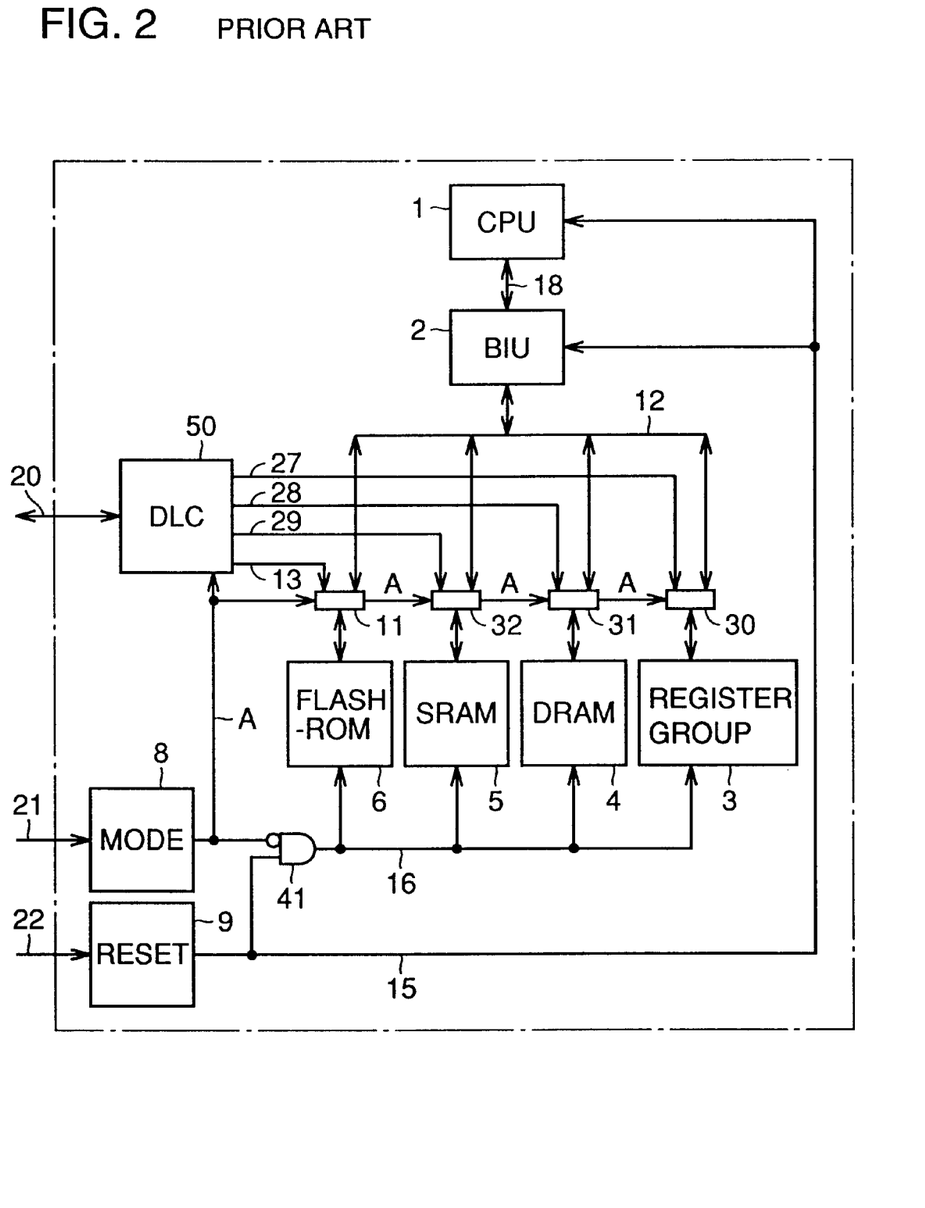
FIG. 2 is a block diagram of another example of a conventional microcomputer.

FIG. 2 is a block diagram showing another example of a conventional microcomputer. This microcomputer allows data input/output with register group 3, DRAM 4, and SRAM 5, via the DLC, in addition to flash memory 6.

The microcomputer of FIG. 2 differs from the microcomputer of FIG. 1 in that selectors 30, 31 and 32 are additionally provided between BIU 2 and each of register group 3, DRAM 4 and SRAM 5, respectively, and that a DLC 50 is provided instead of DLC 48 of FIG. 1. DLC 50 generates and provides to selectors 30–32 a register group control signal group 27, a DRAM control signal group 28, and an SRAM control signal group 29 to control selectors 30–32, in addition to flash memory control signal group 13. In FIG. 2, components corresponding to those of FIG. 1 have the same reference characters allotted. The function and labels thereof are identical. Therefore, detailed description thereof will not be repeated here.

Selectors 30–32 have a function similar to that of selector 11 to select which of signal groups 27–29 and bus group 12 is to be coupled to register group 3, DRAM 4 and SRAM 5.

The microcomputer can input/output data via DLC 50 with respect to register group 3, DRAM 4 and SRAM 5, in addition to flash memory 6.

In the microcomputer of FIG. 1, only flash memory 6 can have data input/output via DLC 48 even though there are a plurality of memories. It is desirable to provide a microcomputer that can have data input/output with respect to an arbitrary memory.

The microcomputer of FIG. 2 can have data input/output with respect to an arbitrary memory via DLC 50. However, this microcomputer requires an DLC 50 that can generate and output individually a signal specified for each memory. For this purpose, the circuit area of DLC 50 is increased. The circuit area of the entire microcomputer is also increased since a selector has to be provided for each memory. It is to be noted that, when a plurality of memories are used, the access rate differs depending upon the type thereof. It is desirable to input/output data reliably and as fast as possible.

SUMMARY OF THE INVENTION

In view of the foregoing, an object of the present invention is to provide a microcomputer with a plurality of memories, including a DLC that can input/output data with respect to an arbitrary memory independent of control by a CPU, and without increasing the area of required circuitry.

Another object of the present invention is to provide a microcomputer with a plurality of memories, including a DLC that can input/output data with respect to an arbitrary memory during reset, without increasing the area of required circuitry.

A further object of the present invention is to provide a microcomputer with the plurality of memories, including a DLC that can reliably input/output data with respect to an arbitrary memory during reset, without increasing the area of required circuitry.

Still another object of the present invention is to provide a microcomputer with a plurality of memories, including a DLC that can input/output data with respect to an arbitrary memory during reset and also after reset, without increasing the area of required circuitry.

A microcomputer according to an aspect of the present invention includes a plurality of memories, a bus interface circuit connected to the plurality of memories through a bus group, a central processing unit to be connected to a plurality of memories via the bus interface circuit, and operating using the memories, a download circuit to be connected to the plurality of memories via the bus interface circuit, carrying out data input/output with respect to the plurality of memories, a first reset signal generation circuit generating and providing to the central processing unit a first reset signal to reset the microcomputer, a second reset signal generation circuit generating and providing to the plurality of memories and the bus interface circuit a second reset signal according to a mode set signal specifying input/output execution using the download circuit and the first reset signal, and a selector selectively coupling the central processing unit and the download circuit to the bus interface circuit in response to the mode set signal.

The central processing unit is reset and its operation stops when the first reset signal is generated. When input/output execution using the download circuit is not specified by the mode set signal, the second reset signal is generated and provided to the bus interface circuit and the plurality of memories. As a result, the operation of the bus interface circuit and the plurality of memories stops. When input/output execution using the download circuit is specified, the second reset signal is not generated. The bus interface circuit and the plurality of memories attain an operable state. Here, the selector couples the download circuit with the bus interface circuit. Therefore, the download circuit can input to/output from an arbitrary memory via the bus interface circuit.

Preferably, the bus interface circuit provides a completion signal to the download circuit when the process of access request from the download circuit is completed.

Since a completion signal is provided to the download circuit when the process of access request is completed, the download circuit can initiate the next process when the access is completely finished. Data can be input/output reliably even if the access rates of the plurality of memories differ.

According to another aspect of the present invention, a microcomputer includes a plurality of memories, a bus interface circuit connected to the plurality of memories through a bus group, a central processing unit to be connected to the plurality of memories via the bus interface circuit, operating using the memories, a download circuit to be connected to the plurality of memories via the bus interface circuit to input/output data with the plurality of memories, a first reset signal generation circuit generating and providing to the central processing unit a first reset signal to reset the central processing unit, a second reset signal generation circuit generating and providing to the plurality of memories and the bus interface circuit a second reset signal according to a mode set signal and a first reset signal, a selector responsive to a predetermined selector control signal to selectively couple the central processing unit and the download circuit to the bus interface circuit, and a selector control signal generation circuit generating and providing to the selector a selector control signal according to the mode set signal, an access reset signal output from the central processing circuit to the bus interface circuit and an access request signal output from the download circuit to the bus interface circuit, and preferentially in response to an access request signal from the central processing unit.

When the first reset signal is generated, the central processing unit is reset and the operation stops. When input/output execution using the download circuit is not specified by the mode set signal, the second reset signal is generated and applied to the bus interface circuit and the plurality of memories. As a result, the operation of the bus interface circuit and the plurality of memories stops. When input/output execution using the download circuit is specified, the second reset signal is not generated. The bus interface circuit and the plurality of memories attain an operable state. Here, the selector couples the download circuit to the bus interface circuit. Therefore, the download circuit can input/output data with respect to an arbitrary memory via the bus interface circuit. In the reset complete state where the first and second reset signals are not generated, the selector connects the circuit corresponding to the access request with the bus interface circuit according to the access request from the central processing unit and the access request from the download circuit. Therefore, access to a memory using the download circuit is allowed even during operation of the central processing unit after the reset is completed. There is no possibility of the operation of the central processing unit being obstructed since the selector processes the access request of the central processing unit with priority over the access request of the download circuit.

According to a further aspect of the present invention, a microcomputer includes a plurality of memories, a bus interface circuit connected to the plurality of memories through a bus group, a central processing unit to be connected to the plurality of memories via the bus interface circuit, and operating using the memories, a download circuit to be connected to the plurality of memories via the bus interface circuit to input/output data with respect to the plurality of memories, and a selective couple circuit connected to the central processing unit to selectively couple either the central processing unit or the download circuit with a memory corresponding to an access request out of the plurality of memories according to a logic value of a predetermined mode set signal, a logic value of an access request signal corresponding to any of the plurality of memories from the central processing unit and a logic value of an access request corresponding to any of the plurality of memories from the download circuit.

The selective couple circuit selectively couples the central processing unit and the download circuit with a memory according to an access request to the memory from the central processing unit, an access request to a memory from the download circuit, and a mode set signal. When the mode set signal indicates selection of the download circuit, access to respective memories can be arbitrated according to the access request by the central processing unit and the access request by the download circuit. As a result, access to a memory by the download circuit is allowed even during operation of the central processing unit.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Although a term "memory" or "memories" are used in the description and the claims of the present application, the term "memory" or "memories" refers to all devices which stores and outputs data at designated address.

First Embodiment

Figure 3:
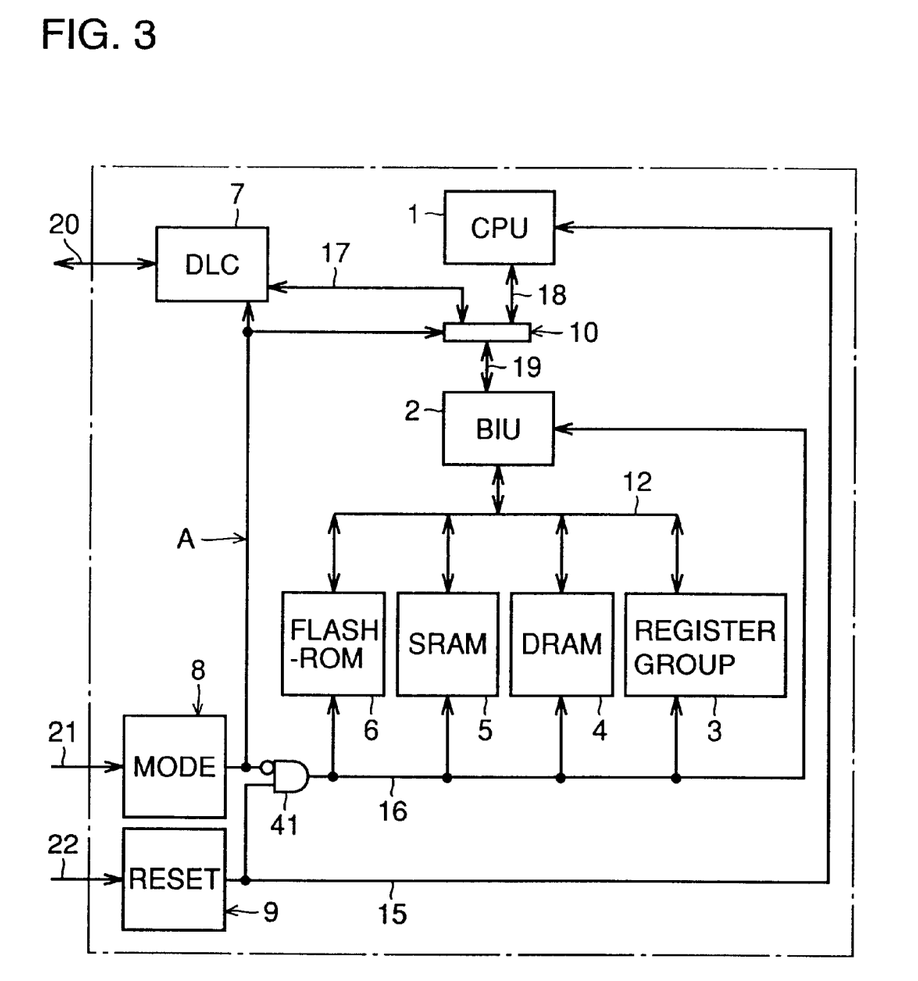
FIG. 3 is a block diagram of a microcomputer according to a first embodiment of the present invention.

Referring to FIG. 3, the microcomputer according to the first embodiment of the present invention differs from the conventional microcomputer of FIG. 1 in that a DLC 7 and a selector 10 are provided instead of DLC 48 and selector 11, respectively, and that a first reset signal 15 is applied only to CPU 1 and a second reset signal 16 output from AND gate 41 is applied to BIU 2, register group 3, DRAM 4, SRAM 5 and flash memory 6. DLC 7 having the download function receives external signal 20 for the DLC to convert the same into a control signal group 17 that can control BIU 2, and converts signal group 17 from BIU 2 into a predetermined format for output as an external signal 20. Selector 10 has a first input receiving signal group 18 and a second input receiving control signal group 17 from DLC 7 to selectively connect either thereof with a control signal group 19 for BIU 2 under control of internal mode set signal A. External signal 20 for the DLC may have a format identical to that of the DLC external signal 20 described in the section of the background art, or may have a different format.

Figure 4:
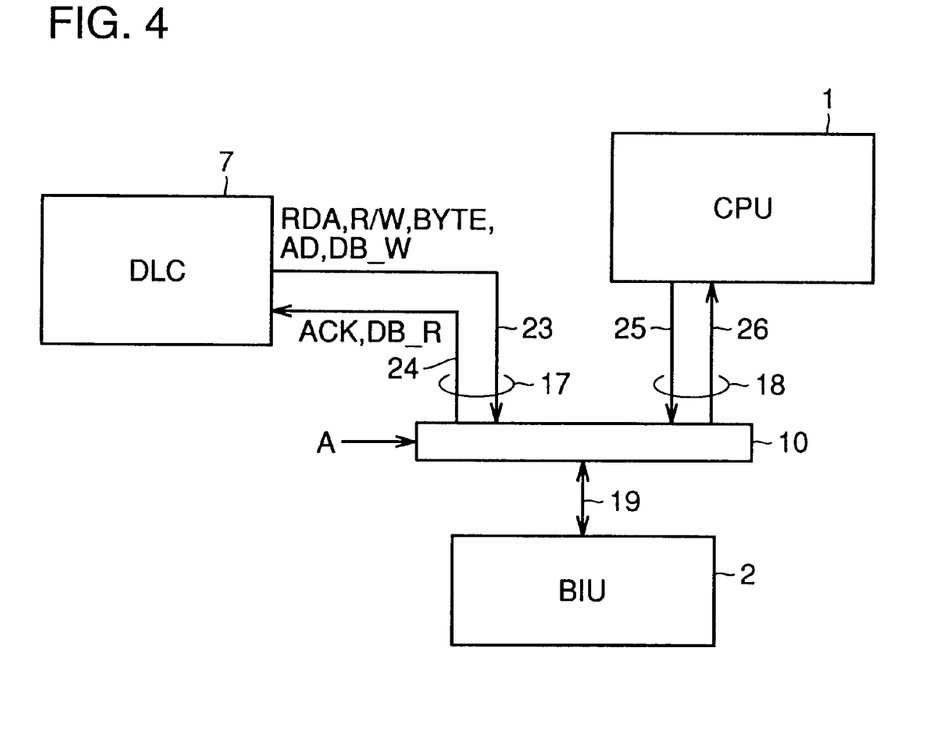
FIG. 4 is an enlarged view of a portion of FIG. 3.

In FIG. 3, components corresponding to those of FIG. 4 have the same reference characters allotted. The labels and functions thereof are also identical. Therefore, detailed description thereof will not be repeated here.

In the following, it is assumed that a signal of an H level represents logical TRUE and an L level represents logical FALSE.

Referring to FIG. 4, selector 10 connects control signal group 17 from DLC 7 to control signal group 19 for BIU 2 when internal mode set signal A is at an H level, and connects signal group 18 to control signal group 19 for BIU 2 when internal mode set signal A is at an L level. Control signal group 17 from DLC 7 includes a signal group 23 and a signal group 24. Signal group 23 includes a data access request signal RDA from DLC 7 to BIU 2, a read/write identify signal R/W, an access request byte number signal BYTE, an AD bus for the memory base address, and a bus DB_W for data. Signal group 24 includes a completion signal ACK indicating completion of read/write and a bus DB_R for data from BIU 2 to DLC 7 via selector 10.

Similarly, control signal group 18 from CPU 1 includes a signal group 25 from CPU 1 to BIU 2, and a signal group 26 from BIU 2 to CPU 1 via selector 10.

As to the operation associated with downloading, the microcomputer of the first embodiment operates as set forth in the following. First, the readout operation from a memory, and then a writing operation to a memory will be described.

It is assumed that the microcomputer is initially at the reset state. Here, reset signal 15 is at an H level. Internal mode set signal A is at an L level when not in the download mode. Reset signal 16 attains an H level, whereby register group 3, DRAM 4, SRAM 5 and flash memory 6 are all reset and the operation stops.

It is assumed that external signal 21 for mode setting is input here. Internal mode set signal A output from mode set circuit 8 attains an H level. Therefore, reset signal 16 attains an L level, whereby register group 3, DRAM 4, SRAM 5 and flash memory 6 all attain an operable state. CPU 1 is still being reset since reset signal 15 is at an H level.

Since internal mode set signal A is at an H level, selector 10 selects control signal group 17 from DLC 7 to connect the same to control signal group 19 for BIU 2. Since control signal group 19 for BIU 2 is distributed to register group 3, DRAM 4, SRAM 5 and flash memory 6 via BIU 2, DLC 7 can control register group 3, DRAM 4, SRAM 5 and flash memory 6 via selector 10 and BIU 2. By means of external signal 20 for the DLC, register group 3, DRAM 4, SRAM 5 and flash memory 6 can be controlled to allow read out. The same applies for writing.

Figure 5:
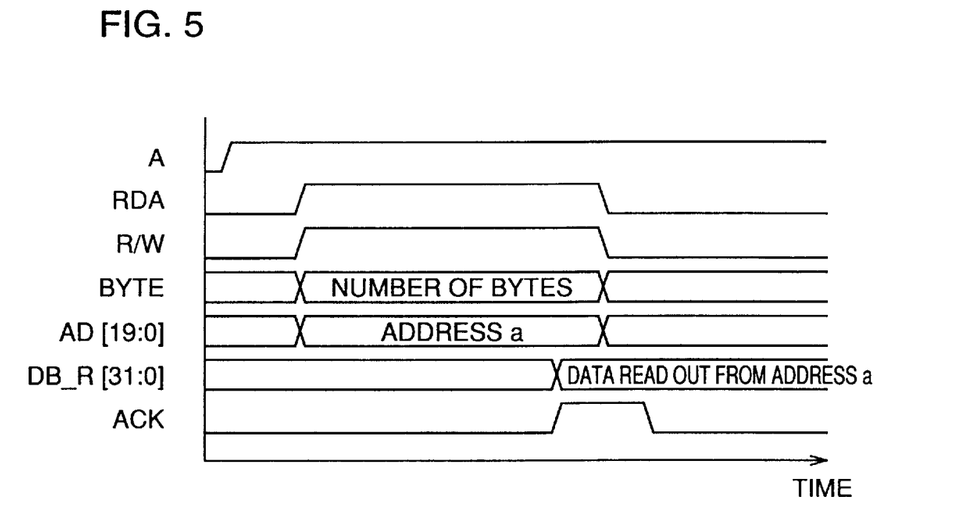
FIG. 5 is a timing chart representing data readout from a memory in the apparatus of the first embodiment.

Referring to FIG. 5, internal mode set signal A of an H level causes selector 10 to connect signal group 23 from DLC 7 to control signal group 19 for BIU 2. Here, DLC 7 renders data access request signal RDA high. DLC 7 also renders read/write identify signal R/W high. This notifies BIU 2 that the data access request towards the memory is a read out request. DLC 7 provides the number of data bytes to be read out for access request byte number signal BYTE, and provides the base address of the memory from which data is to be read out to the AD bus. This base address defines the memory to be selected.

BIU 2 receives data access request signal RDA, read/write identify signal R/W, access request byte number signal BYTE and base address AD, whereby DLC 7 reads out data from a desired memory through bus group 12. BIU 2 places the read out data on bus DB_R and provides the data to DLC 7 via selector 10. Here, BIU 2 provides completion signal ACK notifying completion of read out to DLC 7 via selector 10.

DLC 7 responds to completion signal ACK from BIU 2 to store the data on bus DB_R. Also, the read out data is provided outside using external signal 20 for the DLC.

Figure 6:
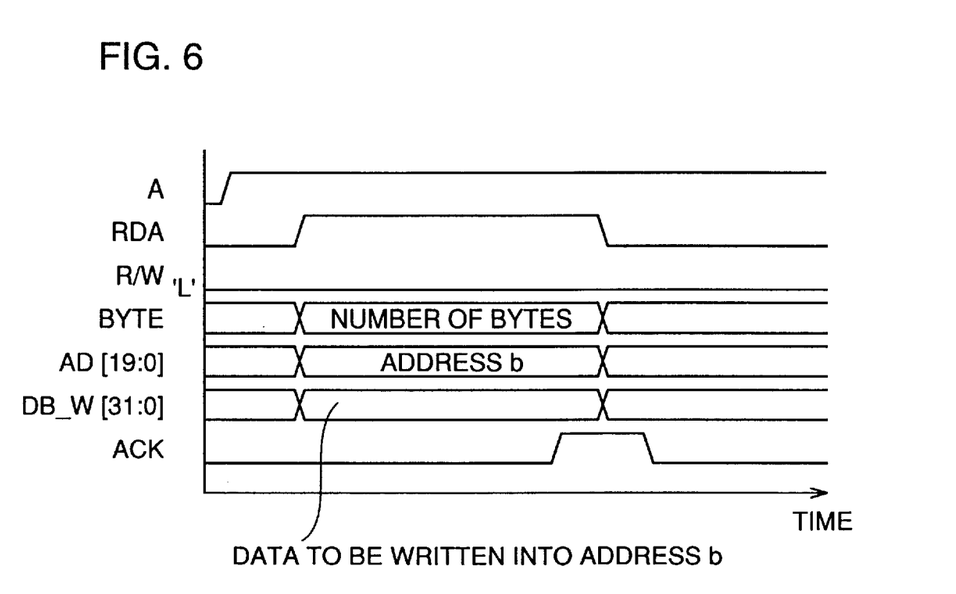
FIG. 6 is a timing chart representing data writing into a memory in the apparatus of the first embodiment.

Writing data into a desired memory is set forth in the following. The operation up to setting the download mode is similar to that of the read out operation. Referring to FIG. 6, internal mode set signal A of an H level causes control signal group 17 to be connected to control signal group 19 for BIU 2 from DLC 7. DLC 7 drives data access request signal RDA to an H level. DLC 7 also drives read/write identify signal R/W to an L level. BIU 2 is notified that the data access corresponds to a write request. DLC 7 provides the number of bytes to be written into the memory in access request byte number signal BYTE, and outputs the base address of the memory to be written on the AD bus. DLC 7 further outputs the data to be written on bus DB_W.

BIU 2 receives signal data access request signal RDA, read/write identify signal R/W, access request byte number signal BYTE, memory base address AD and the data on bus DB_W to write data into the address of the desired memory through bus group 12. When writing is completed, BIU 2 outputs completion signal ACK.

DLC 7 responds to completion signal ACK to store the data on bus DB_R. Then, DLC 7 outputs a signal notifying completion of writing into a memory using external signal 20 for the DLC.

According to the apparatus of the first embodiment, DLC 7 can access a desired memory via selector 10 and BIU 2. Therefore, it is not necessary to generate and output a signal specified particularly for each memory. Since only one selector 10 is required, the occupying area thereof does not differ greatly from that of selector 11 of FIG. 1. As a result, data can be input/output with respect to an arbitrary memory while avoiding increase of circuit area for DLC 7 and avoiding increase of the chip area for the microcomputer.

A completion signal ACK indicating completion of data reading/writing is output from BIU 2 to DLC 7. Therefore, DLC 7 can initiate the next operation when the reading/writing by BIU 2 has completely ended even when the time required for writing/reading of each memory differs therebetween. Output of read data and writing of the next data can be carried out properly. The process can be speeded since DLC 7 does not have to wait unnecessarily for a long period of time.

Second Embodiment

The previous microcomputer of the first embodiment inputs/outputs data with respect to each memory using DLC 7 during reset of the microcomputer. If downloading to a memory can be implemented only when the microcomputer is in a reset state, the microcomputer must be reset and the operation of CPU 1 stopped every time for downloading. This is inconvenient. The microcomputer of the second embodiment is directed to input/output data with respect to an arbitrary memory without stopping the operation of CPU 1.

Figure 7:
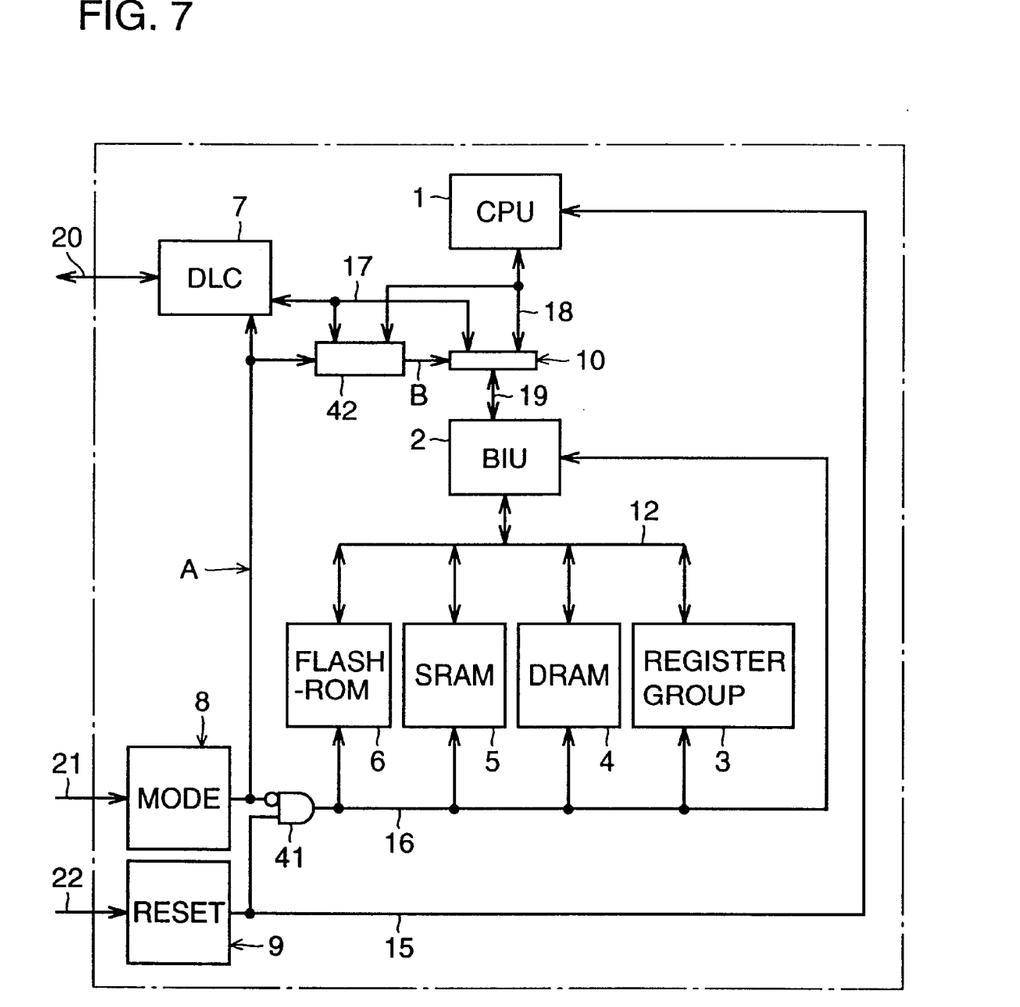
FIG. 7 is a block diagram of a microcomputer according to a second embodiment of the present invention.

Referring to FIG. 7, the microcomputer of the second embodiment differs from the microcomputer of the first embodiment shown in FIG. 3 in that a selector control signal generation circuit 42 is added. Selector control signal generation circuit 42 receives an internal mode set signal A, a portion of control signal group 17 (data access request signal RDA) from DLC 7, and a portion of control signal group 18 (access request signal RDA_CPU from CPU 1 to BIU 2) from CPU 1 to generate and provide to selector 10 a signal B to control selector 10. The remaining elements are similar to those of the microcomputer of the first embodiment. Therefore, the components in FIG. 7 corresponding to those of FIG. 3 have the same reference characters allotted, and detailed description thereof will not be repeated here.

Figure 8:
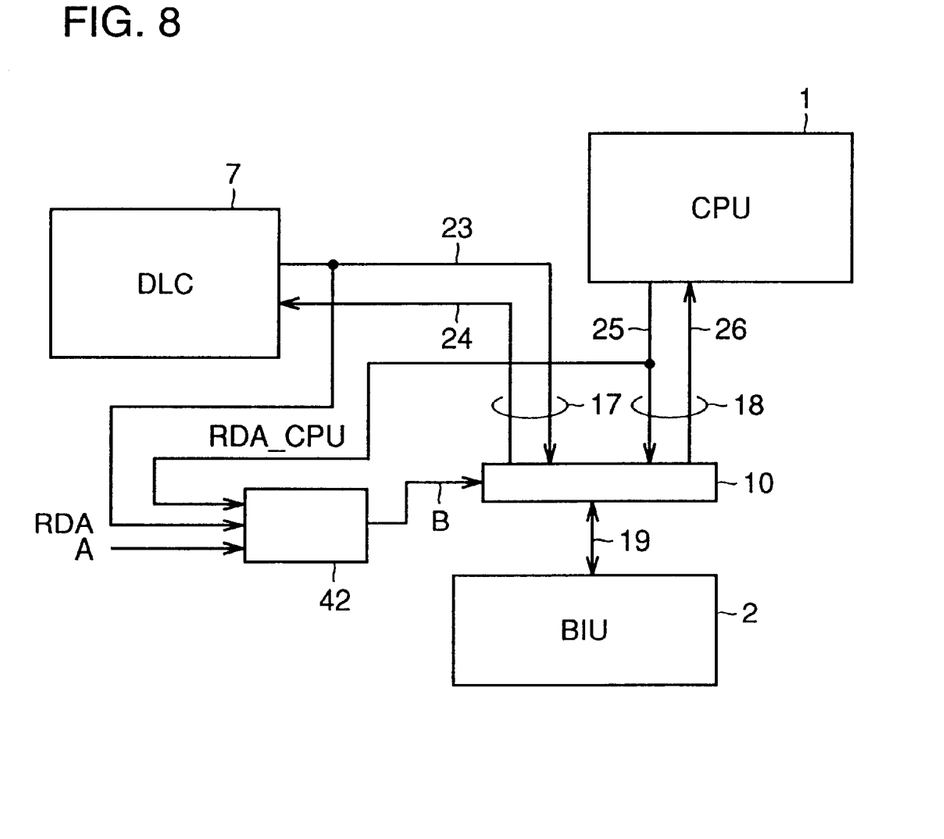
FIG. 8 is an enlarged view of a portion of FIG. 7.

Referring to FIG. 8, control signal group 17 from DLC 7 includes a signal group 23 and a signal group 24 from BIU 2 to DLC 7. Signal group 23 from DLC 7 to BIU 2 includes data access request signal RDA, read/write identify signal R/W, access request byte number signal BYTE, the AD bus and bus DB_W. Signal group 24 includes completion signal ACK and bus DB_R. All are similar to those of the first embodiment.

In the microcomputer of the second embodiment, it is to be noted that data access control signal RDA and access request signal RDA_CPU from CPU 1 to BIU 2 are applied to selector control signal generation circuit 42.

Figure 9:
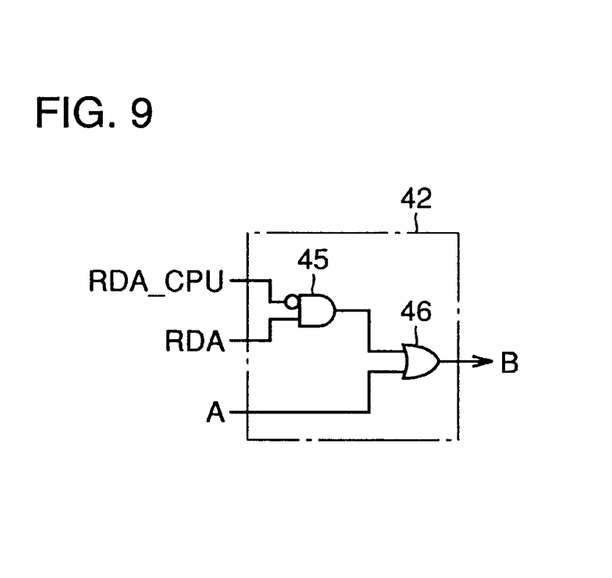
FIG. 9 is a circuit block diagram of a selector control signal generation circuit 42.

Referring to FIG. 9, selector control signal generation circuit 42 includes an AND gate 45 having a first input coupled to an inverted version of access request signal RDA_CPU from CPU 1 to BIU 2 and a second input coupled to data access request signal RDA, and an OR gate 46 having a first input coupled to the output of AND gate 45 and a second input coupled to internal mode set signal A. The output of OR gate 46 is applied to selector 10 as a signal B.

DLC 7 drives data access request signal RDA to an H level when an access request is output to BIU 2. Also, access request signal RDA_CPU from CPU 1 to BIU 2 is driven to an H level when CPU 1 provides an access request to BIU 2. The meaning of internal mode set signal A is identical to that of the first embodiment.

In the microcomputer of the second embodiment, selector control signal generation circuit 42 operates as set forth in the following to control selector 10. First, the occasion of a reset state is considered. While resetting, internal mode set signal A is at H level. Signal B output from OR gate 46 attains an H level irrespective to the level of the output of AND gate 45. Therefore, selector 10 connects control signal group 17 from DLC 7 to control signal group 19 for BIU 2. Reset signal 15 is driven to an H level and reset signal 16 is driven to an L level. Therefore, CPU 1 is reset and the operation stops. However, register group 3, DRAM 4, SRAM 5 and flash memory 6 all attain an operable state. Data writing and data read out with respect to each memory by DLC 7 are carried out in a manner similar to those of the first embodiment.

Following the completion of reset (reset signals 15 and 16 both at an L level), selector control signal generation circuit 42 operates as set forth in the following. Internal mode set signal A attains an L level. Therefore, the level of signal B is determined by the level of access request signal RDA_CPU from CPU 1 to BIU 2 and data access request signal RDA.

When CPU 1 accesses each memory via BIU 2, CPU 1 provides access request signal RDA_CPU of an H level from CPU 1 to BIU 2. The output of AND gate 45 attains an L level irrespective of the level of data access request signal RDA. Since internal mode set signal A is at L level, signal B attains an L level. Therefore, selector 10 connects signal group 18 to control signal group 19 for BIU 2, whereby access to each memory is effected by CPU 1. Here, the connection of selector 10 does not change even if DLC 7 drives data access request signal RDA to an H level.

Consider the case where CPU 1 does not access BIU 2. In this case, access request signal RDA_CPU from CPU 1 to BIU 2 attains an L level. The level of the output of AND gate 45 depends upon data access request signal RDA. When DLC 7 drives data access request signal RDA to access BIU 2 to an H level, the output of AND gate 45 attains an H level. Signal B also attains an H level. Selector 10 connects control signal group 17 from DLC 7 to control signal group 19 for BIU 2. Therefore, DLC 7 can access each memory via BIU 2.

In other words, selector control signal generation circuit 42 processes the access request from CPU 1 with priority over the access request from DLC 7 when CPU 1 requests access to BIU 2. DLC 7 processes the access request with respect to BIU 2 when there is no access request from CPU 1.

According to the microcomputer of the second embodiment, DLC 7 can access each memory via BIU 2 even after reset is completed in addition to the reset state, provided that CPU 1 is not accessing each memory. More specifically, selector control signal generation circuit 42 arbitrates the access request from CPU 1 and from DLC 7, giving priority on CPU 1. Therefore, the operation of CPU 1 will not be obstructed by the operation of DLC 7.

If necessary, DLC 7 can access each memory via BIU 2 taking advantage of the intermission when CPU 1 is not accessing the memory even after reset is completed as well as during reset. It is therefore no longer necessary to reset the microcomputer in order to download data to a memory or to read out data from a memory.

According to the present embodiment, the selector couples the download circuit with the bus interface circuit when a first reset signal is generated and input/output execution of the download circuit is not specified by the mode set signal. The bus interface circuit and the plurality of memories are in operable state. Therefore, the download circuit can input/output data with respect to an arbitrary memory via the bus interface circuit. The required circuit complexity is extremely small, and increase in chip area can be avoided.

Since a completion signal is applied to the download circuit when the process of the access request is completed, the download circuit can initiate the next process when the access has been completely ended. Data can be input/output reliably even when the access rates of the plurality of memories differ.

In the reset complete state, the access request from the central processing unit and the access request from the download circuit are arbitrated to allow access to a memory using the download circuit even during operation of the central processing unit. It is therefore not necessary to stop the operation of the central processing unit to input/output data to/from a memory. Since the selector carries out the process giving priority of the access request of the central processing unit over the access request of the download circuit, there is no possibility of the operation of the central processing unit being obstructed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A microcomputer comprising:
   a plurality of memories;
   a bus interface circuit connected to said plurality of memories through a bus group;
   a central processing unit to be coupled to said memories via said bus interface circuit, and operating using said memories, said central processing unit being reset in response to a reset signal to stop its operation;
   a download circuit coupled to said memories via said bus interface circuit, and carrying out data input/output with respect to said memories;
   a first reset signal generation circuit generating and applying to said central processing unit a first reset signal to reset said central processing unit;
   a second reset signal generation circuit generating and applying to said plurality of memories and said bus interface circuit a second reset signal according to a mode set signal specifying input/output execution with one of said memories using said download circuit and said first reset signal; and
   a selector selectively coupling said central processing unit and said download circuit to said bus interface circuit in response to said mode set signal.

2. The microcomputer according to claim 1, wherein said second reset signal generation circuit includes a logic circuit having a first input receiving said first reset signal and a second input receiving said mode set signal, and an output coupled to said second reset signal.

3. The microcomputer according to claim 2, wherein said central processing unit stops its operation when said first reset signal attains a predetermined first value representing true by a predetermined logic, and starts its operation when said first reset signal attains a second value representing false by said logic.

4. The microcomputer according to claim 3, wherein said mode set signal selectively takes said first value and said second value.

5. The microcomputer according to claim 4, wherein said plurality of memories and said bus interface circuit are all reset and stop their operation when said second reset signal takes said first value, and attain an operable state when said second reset signal takes said second value.

6. The microcomputer according to claim 5, wherein said logic circuit includes an AND gate having a first input receiving an inversion of said mode set signal, a second input receiving said first reset signal, and an output coupled to said second reset signal.

7. The microcomputer according to claim 6, wherein said selector couples said download circuit to said memory in response to said mode set signal taking said first value, and couples said central processing unit to said memory in response to said mode set signal taking said second value.

8. The microcomputer according to claim 1, wherein said bus interface circuit outputs a completion signal to said download circuit when a process of access request from said download circuit is completed.

9. A microcomputer comprising:
   a plurality of memories;
   a bus interface circuit connected to said plurality of memories through a bus group;
   a central processing unit to be coupled to said plurality of memories via said bus interface circuit, said central processing unit operating using said memories;
   a download circuit to be connected to said plurality of memories via said bus interface circuit, and carrying out data input/output with respect to said plurality of memories;
   a first reset signal generation circuit generating and applying to said central processing unit a first reset signal to reset said central processing unit;
   a second reset signal generation circuit generating and applying to said plurality of memories and said bus interface circuit a second reset signal according to a mode set signal and said first reset signal;
   a selector selectively coupling said central processing unit and said download circuit to said bus interface circuit in response to a predetermined selector control signal; and
   a selector control signal generation circuit generating and applying to said selector said selector control signal according to said mode set signal, an access request signal output to said bus interface circuit from said central processing unit and an access request signal output from said download circuit output to said bus interface circuit, and preferentially in response to the access request signal from said central processing unit.

10. The microcomputer according to claim 9, wherein said central processing unit outputs a first access request signal taking a first value representing true by a predetermined logic when access is requested to one of said memories, and taking a second value representing false by said logic when access is not requested, wherein said download circuit outputs a second access request signal taking said first value when access to said memories is requested, and taking said second value when access is not requested, said mode set signal taking said first value when input/output by said download circuit is specified, and otherwise said second value, wherein said selector control signal generation circuit includes a first logic circuit providing said selector control signal in response to said first access request signal, said second access request signal and said mode set signal.

11. The microcomputer according to claim 10, wherein said first logic circuit comprises first AND gate having a first input receiving an inversion of said first access request signal, a second input receiving said second access request signal, and an output, and an OR gate having a first input coupled to an output of said first AND gate, a second input coupled to said mode set signal, and an output coupled to said selector control signal.

12. The microcomputer according to claim 11, wherein said selector selects and couples said download circuit to one of said memories in response to said first value of said selector control signal, and selects and couples said central processing unit to one of said memories in response to said second value of said selector control signal.

13. The microcomputer according to claim 9, wherein said second reset signal generation circuit includes a logic circuit having a first input receiving said first reset signal, a second input receiving said mode set signal, and an output coupled to said second reset signal.

14. The microcomputer according to claim 13, wherein said central processing unit stops its operation when said first reset signal attains said first value, and starts its operation when said first reset signal attains said second value.

15. The microcomputer according to claim 14, wherein said plurality of memories and said bus interface circuit are all reset and stop their operation when said second reset signal takes said first value, and attain an operable state when said second reset signal takes said second value.

16. The microcomputer according to claim 15, wherein said logic circuit includes a second AND gate having a first input receiving an inversion of said mode set signal, a second input receiving said first reset signal, and an output coupled to said second reset signal.

17. A microcomputer comprising:
a plurality of memories;
a bus interface circuit connected to said plurality of memories through a bus group;
a central processing unit connected to said plurality of memories via said bus interface circuit, and operating using said memory;
a download circuit to be connected to said plurality of memories via said bus interface circuit, and carrying out data input/output with respect to said plurality of memories; and
selective couple means connected to said central processing unit for selectively coupling one of said central processing unit and said download circuit to one of said memories corresponding to access request according to a logic value of a predetermined mode set signal, a logic value of an access request signal from said central processing unit to one of said plurality of memories, and a logic value of an access request from said download circuit to one of said plurality of memories.

18. The microcomputer according to claim 17, wherein said selective couple means comprises select signal generation means for providing a select signal selecting said download circuit in response to said mode set signal attaining a "true" value of a predetermined logic, and a signal indicating access request to one of said plurality of memories from said central processing unit attaining logic "false", and in response to a signal indicating access request from said download circuit to one of said plurality of memories attaining logic "true", and otherwise selecting said central processing circuit, and select means coupled bidirectionally to said central processing unit, said download circuit and said plurality of memories, and to receive said select signal from said select signal generation means, for selecting said central processing unit and said download circuit to couple one of said plurality of memories corresponding to an access request to the selected one of said central processing unit and said download circuit in response to said select signal, the access request signal from said central processing unit and the access request signal from said download circuit.

19. The microcomputer according to claim 18, wherein said select signal generation means includes arbitration means for arbitrating access request from said central processing unit to said plurality of memories and access request from said download circuit to said plurality of memories.

20. The microcomputer according to claim 19, wherein said arbitration means includes means for arbitrating the access request from said central processing unit to said plurality of memories and the access request from said download circuit to said plurality of memories, giving priority to the access request from said central processing unit to said plurality of memories.

* * * * *